US009950442B2

(12) United States Patent
Hayashi (10) Patent No.: US 9,950,442 B2
(45) Date of Patent: Apr. 24, 2018

(54) METHOD OF PRODUCING HONEYCOMB STRUCTURAL BODY

(71) Applicant: DENSO CORPORATION, Kariya, Aichi-pref. (JP)

(72) Inventor: Naohiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 571 days.

(21) Appl. No.: 14/542,116

(22) Filed: Nov. 14, 2014

(65) Prior Publication Data
US 2015/0137431 A1  May 21, 2015

(30) Foreign Application Priority Data
Nov. 15, 2013  (JP) .................. 2013-236965

(51) Int. Cl.
*B28B 3/26* (2006.01)
*C04B 35/64* (2006.01)
(Continued)

(52) U.S. Cl.
CPC .......... *B28B 3/269* (2013.01); *B01D 46/0001* (2013.01); *B01D 46/2455* (2013.01); *B29C 47/0028* (2013.01); *B29C 47/128* (2013.01); *C04B 35/195* (2013.01); *C04B 35/565* (2013.01); *C04B 38/0006* (2013.01); *B29C 47/56* (2013.01); *C04B 2111/0081* (2013.01); *C04B 2235/6021* (2013.01);
(Continued)

(58) Field of Classification Search
CPC ............ B28B 3/269; B01D 46/0001; B01D 46/2455; B29C 47/0028; B29C 47/128; B29C 47/56; C04B 35/565; C04B 35/195; C04B 38/0006; C04B 2235/6021; C04B 2111/0081; F01N 13/017; F01N 3/2828; F01N 2330/48
USPC ....... 264/177.1, 177.12, 603, 630, 631, 652; 425/113, 192 R, 382 R, 469
See application file for complete search history.

(56) References Cited

U.S. PATENT DOCUMENTS 3,905,743 A * 9/1975 Bagley .................... B28B 3/269
425/382 R
4,373,895 A * 2/1983 Yamamoto ............ B22F 3/1115
264/177.12
(Continued)

FOREIGN PATENT DOCUMENTS

JP   04-332604   11/1992
JP   10-264125   10/1998
(Continued)

*Primary Examiner* — Nahida Sultana
(74) *Attorney, Agent, or Firm* — Nixon & Vanderhye P.C.

(57) ABSTRACT

A method feeds raw material into a metal die and extrudes the raw material to produce a honeycomb molded body. The method fires the honeycomb molded body to make a honeycomb structural body. The metal die has a first metal die and a second metal die arranged at an upstream side of an extrusion direction of the raw material and a second metal die arranged at a downstream side of the extrusion direction of the raw material. The first metal die has a projection section and the second metal die has a penetration hole. The projection section is fitted to the penetration hole to assemble the first metal die and the second metal die. Communication holes formed in the second metal die communicate with raw material second feeding holes formed in the first metal die.

9 Claims, 11 Drawing Sheets

(51) Int. Cl.
  *B28B 3/20*   (2006.01)
  *C04B 38/00*   (2006.01)
  *C04B 35/195*   (2006.01)
  *C04B 35/565*   (2006.01)
  *B29C 47/00*   (2006.01)
  *B29C 47/12*   (2006.01)
  *B01D 46/24*   (2006.01)
  *B01D 46/00*   (2006.01)
  *C04B 111/00*   (2006.01)
  *F01N 3/28*   (2006.01)
  *F01N 13/00*   (2010.01)
  *B29C 47/56*   (2006.01)

(52) U.S. Cl.
  CPC .......... *F01N 3/2828* (2013.01); *F01N 13/017* (2014.06); *F01N 2330/48* (2013.01)

(56) References Cited

U.S. PATENT DOCUMENTS

| | | | | |
|---|---|---|---|---|
| 4,550,005 A * | 10/1985 | Kato | ......... | B28B 3/269 264/177.12 |
| 4,743,191 A | 5/1988 | Chao | | |
| 4,839,214 A * | 6/1989 | Oda | ......... | B28B 3/269 156/89.22 |
| 4,846,657 A * | 7/1989 | Chao | ......... | B28B 3/269 264/177.12 |
| 5,108,685 A | 4/1992 | Kragle | | |
| 5,238,386 A * | 8/1993 | Cunningham | ......... | B28B 3/269 264/177.12 |
| 5,702,659 A * | 12/1997 | Kragle | ......... | B28B 3/269 264/177.11 |
| 5,811,048 A * | 9/1998 | Dunn | ......... | B01F 5/0604 264/177.11 |
| 6,159,431 A | 12/2000 | Inoue et al. | | |
| 6,343,923 B1 * | 2/2002 | Cunningham | ......... | B28B 3/269 264/177.12 |
| 7,294,301 B2 * | 11/2007 | Dannoux | ......... | B28B 3/2636 264/171.1 |
| 7,858,007 B2 * | 12/2010 | Kaneko | ......... | B23H 9/00 264/177.11 |
| 2002/0042344 A1 | 4/2002 | Kondo et al. | | |
| 2004/0123573 A1 | 7/2004 | Ichikawa et al. | | |
| 2004/0131512 A1 | 7/2004 | Abe et al. | | |
| 2004/0164464 A1 * | 8/2004 | Lubberts | ......... | B28B 3/20 264/630 |
| 2009/0140453 A1 * | 6/2009 | Hagg | ......... | B28B 11/007 264/177.12 |
| 2010/0244309 A1 * | 9/2010 | Hayashi | ......... | B23P 15/243 264/177.12 |
| 2013/0315788 A1 | 11/2013 | Suzuki et al. | | |
| 2014/0017509 A1 * | 1/2014 | Takahashi | ......... | B23K 1/0008 428/593 |
| 2014/0205794 A1 | 7/2014 | Tamai et al. | | |

FOREIGN PATENT DOCUMENTS

| | | |
|---|---|---|
| JP | 2002-177794 | 6/2002 |
| JP | 2002-326035 | 11/2002 |
| JP | 2003-025316 | 1/2003 |
| JP | 2008-200605 | 9/2008 |
| JP | 2013-173133 | 9/2013 |
| JP | 2013-173134 | 9/2013 |
| JP | 2013-244437 | 12/2013 |
| JP | 2014-136211 | 7/2014 |
| JP | 2014-213289 | 11/2014 |

\* cited by examiner

DOWNSTREAM SIDE D ⟷ UPSTREAM SIDE U

EXTRUSION DIRECTION X (FEEDING DIRECTION) OF RAW MATERIAL

METHOD OF PRODUCING HONEYCOMB STRUCTURAL BODY

CROSS-REFERENCE TO RELATED APPLICATION

This application is related to and claims priority from Japanese Patent Application No. 2013-236965 filed on Nov. 15, 2013, the contents of which are hereby incorporated by reference.

BACKGROUND OF THE INVENTION

1. Field of the Invention

The present invention relates to methods of extruding a raw material to shape a honeycomb molded body and fire the honeycomb molded body to produce a honeycomb structural body.

2. Description of the Related Art

A honeycomb structural body has been widely known to support catalyst therein. The catalyst has a purification property. In general, such a honeycomb structural body has cell walls arranged in a lattice like shape and a plurality of cells surrounded by the cell walls. When the honeycomb structural body supports catalyst therein and is mounted on an exhaust gas pipe in an exhaust gas purification system of a motor vehicle, etc., the catalyst supported in the honeycomb structural body is activated at a predetermined high temperature by using exhaust gas emitted from an internal combustion engine passed through the exhaust gas pipe of the motor vehicle. The activated catalyst purifies the exhaust gas, and the purified exhaust gas is discharged to the outside of the exhaust gas purification system.

Recently, because the vehicle emissions control of reducing motor vehicle emissions, etc. is becoming stricter year by year in view of environmental protection, there is a strong demand to decrease carbon dioxide contained in exhaust gas emitted from an internal combustion engine and more improve fuel efficiency of motor vehicles. Thus, there is a strong demand for the honeycomb structural body to have an improved and excellent exhaust gas purification capability. In order to satisfy these recent demands, honeycomb structural bodies having various structures have been proposed. A conventional technique has been proposed with a honeycomb structural body having an improved structure in which an inside section and outside section have a different cell density. Another technique has disclosed another structure of a honeycomb structural body in which a boundary partition wall is formed between the inside section and the outside section in a cross section perpendicular to an axial direction of the honeycomb structural body. However, these techniques require a complicated design for producing a metal die for use in the production of such a complicated structure of the honeycomb structural body. Further, there is a possible drawback of breaking the metal die when the honeycomb structural body is produced, and generating defects of cells during the production of the produced honeycomb structural body. In fact, it is difficult to produce a honeycomb structural body having a complicated structure by using a metal die.

In order to solve such a conventional problem, a patent document, Japanese patent laid open publication No. H04-332604, discloses a method using a metal die having an improved structure in which an inside metal die having a small diameter is fitted to an outside metal die having a penetration hole.

However, in the structure of the metal die used in the patent document, a high local stress is generated the fitted section between the inside metal die and the outside metal die, and as a result, the metal die is broken by a high local stress when the metal die is used for producing a honeycomb structural body. In addition, it is generally difficult to correctly mate feeding holes formed in the inside metal die with feeding holes formed in the outside metal die, and to produce the metal die having such a complicated structure. That is, it is difficult to produce a metal die corresponding to a complicated and various types of cell structures of a honeycomb structural body.

SUMMARY

It is therefore desired to provide a method of producing a honeycomb structural body having various cell structures by using a metal die having an improved structure with excellent manufacturing efficiency.

An exemplary embodiment provides a method of producing a honeycomb structural body comprised of a shaping step and a firing step. The method uses a metal die having a first metal die and a second metal die assembled together. The shaping step feeds raw material from a feeding surface side into the inside of the metal die, and extrudes the raw material from an extrusion surface in the metal die outside of the metal die to shape a honeycomb molded body. The firing step fires the honeycomb molded body at a high temperature to produce a honeycomb structural body. In particular, the method uses a metal die having a specific structure comprised of a first metal die and a second metal die. The first metal die is arranged at an upstream side of an extrusion direction of the raw material and the second metal die is arranged at a downstream side of the extrusion direction. The first metal die has a projection section, a plurality of raw material first feeding holes, first slits and a plurality of raw material second feeding holes. In the metal die, the projection section of the first metal die is projected toward the downstream side of the first metal die in the extrusion direction. The raw material first feeding holes in the first metal die are formed in the projection section extending from the feeding surface toward the extrusion direction. The first slits in the first metal die are formed in a honeycomb structural shape at an extrusion surface to communicate with the raw material first feeding holes. The raw material second feeding holes in the first metal die are formed around the projection section of the first metal die, and the feeding surface communicates with an abutting surface of the second metal die through the raw material second feeding holes. The second metal die has a penetration hole, a plurality of communication holes and second slits. The penetration hole is fitted with the projection section of the first metal die in the metal die. The communication holes are formed around the penetration hole and extend toward the extrusion direction from the abutting surface side. The second slits are arranged in a honeycomb structural shape at the extrusion surface to communicate with the communication holes in the first metal die. The communication holes in the second metal die communicate with the raw material second feeding holes in the first metal die.

The method according to an exemplary embodiment performs the shaping step and the firing step to produce a honeycomb structural body. In particular, the shaping steps use the metal die having the improved structure previously described. When the shaping step feeds raw material from the feeding surface of the metal die, the raw material passes through the raw material first feeding holes. The shaping step further extrudes the raw material from the first slits in a honeycomb structural shape. The raw material having the honeycomb structural shape passes through the raw material second feeding holes and extruded from the second slits to produce the honeycomb molded body having a honeycomb structural shape. It is also possible for the first metal die and the second metal die to have the first slits and the second slits having a different slit density and a different shape according to various demands. It is therefore for the method to produce the honeycomb structural body having a different cell structure.

In the projection section of the first metal die in the metal die used by the method, the raw material is fed from the feeding surface, and smoothly extruded from the first slits on the extrusion surface through the raw material first feeding holes. On the other hand, the raw material, which has passed through the raw material second feeding holes in the first metal die, is extruded from the second slits in the second metal die through the communication holes. The raw material second feeding holes communicate with the communication holes. In particular, it is possible for the surface of the second metal die to receive a deformation stress of the first metal die generated during the shaping step. It is possible for the structure of the metal die to suppress generation of a local high stress in the metal die when a shaping pressure (i.e. a feeding pressure) of the raw material is increased during the shaping step. Accordingly, it is possible for the method according to the exemplary embodiment to perform the shaping step at a high shaping pressure (i.e. the feeding pressure) without damage and deformation of the metal die, and produce the honeycomb structural body with excellent productivity.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

A description will be given of a method according to a preferred exemplary embodiment of producing a honeycomb structural body. The method uses a metal die having a specific structure.

It is possible to apply the method according to the exemplary embodiment to honeycomb structural bodies having various cell structures. For example, it is possible to apply the method of the exemplary embodiment to produce a honeycomb structural body of a columnar structure in which two cell density regions are formed in a cross section which is perpendicular to an axial direction of the honeycomb structural body. In particular, the two cell density sections are composed of an interior cell density section (at a central point side) and an exterior cell density section (at an outer peripheral side). The exterior cell density section has a low cell density when compared with a cell density of the interior cell density section. It is possible for the two cell density sections of the honeycomb structural body to have the following effects. One is an effect of keeping a high exhaust gas purification capability in order to reduce motor vehicle emissions. The other is an effect of suppressing a difference between the interior cell density section and the exterior cell density section when the honeycomb structural body is rapidly cooled, and to increase a thermal shock resistance of the honeycomb structural body.

Further, it is possible to apply the method of the exemplary embodiment to honeycomb structural bodies having a plurality of cell regions in which the cell regions have a different cell density which is decreased stepwise from an interior cell region toward the exterior cell region. This cell density structure makes it possible to suppress a difference between the interior cell density section and the exterior cell density section when the honeycomb structural body is rapidly cooled, and to increase a thermal shock resistance of the honeycomb structural body. However, this cell density section has a possible drawback to decrease the strength (such as isostatic strength) of the honeycomb structural body because the uppermost section cell density is decreased too low. In order to avoid this drawback and have necessary cell density strength, it is preferable for the uppermost section cell density to have an increased cell density.

Further, it is possible for the method according to the exemplary embodiment to produce the honeycomb structural body by using a porous medium. For example, it is possible for a catalyst converter to use the honeycomb structural body made of a porous medium. Such a catalyst converter contains catalyst therein, and the catalyst is capable of purifying exhaust gas emitted from an internal combustion engine of a motor vehicle, etc. The catalyst is supported on a surface of partition walls and in the inside of cells. It is acceptable for the honeycomb structural body to have the porosity within a range of 10 to 70%.

It is possible for the cells formed in the honeycomb structural body to have various shapes, such as a circular shape, a polygonal shape (for example, a square shape, a hexagonal shape, . . . ), etc. in a cross section perpendicular to an axial direction of the honeycomb structural body. It is further possible for the cell density section to have an outline of a circular shape, a racetrack, etc. in a direction perpendicular to an axial direction of the honeycomb structural body.

It is also possible to form a boundary partition wall between adjacent sections having a different cell density. For example, it is possible for the boundary partition wall to have a thickness within a range of 20 to 250 µm. It is further possible for the boundary partition wall to have a circular shape, a polygonal shape, etc. in a cross section perpendicular to an axial direction of the honeycomb structural body.

First Exemplary Embodiment

A description will be given of a method of producing a honeycomb structural body 5 according to a first exemplary embodiment with reference to FIG. 1 to FIG. 19.

Figure 1:
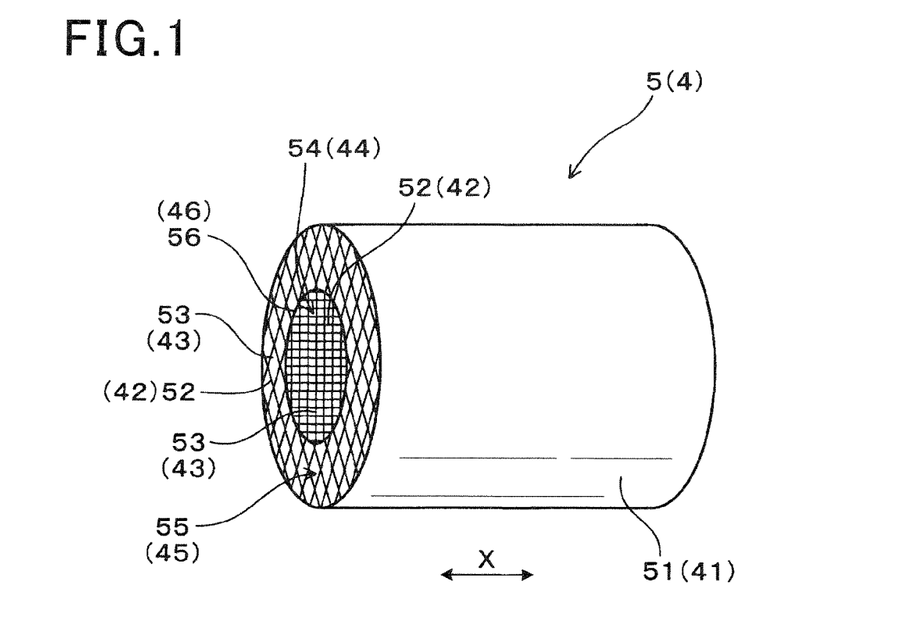
FIG. 1 is a perspective view showing a honeycomb structural body 5 (or a honeycomb molded body 4) produced by a method according to a first exemplary embodiment of the present invention.
Figure 2:
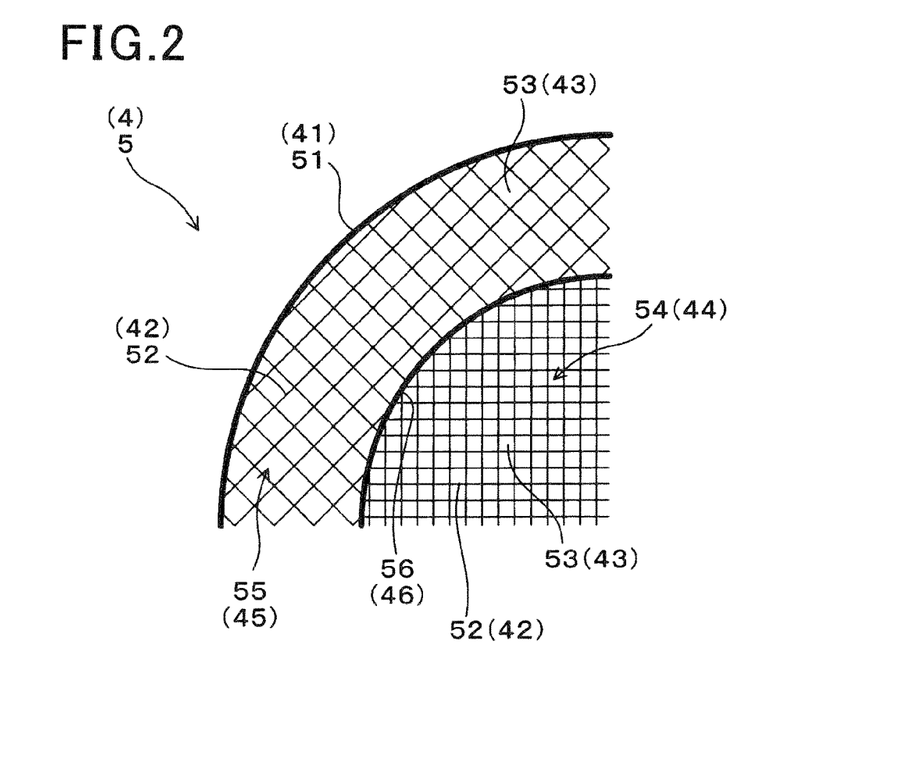
FIG. 2 is a view showing a cross section of the honeycomb structural body 5 (i.e. the honeycomb molded body 4) produced by the method according to the first exemplary embodiment of the present invention in a direction perpendicular to an axial direction of the honeycomb structural body.

FIG. 1 is a perspective view showing the honeycomb structural body 5 (or a honeycomb molded body) produced by the method according to the first exemplary embodiment. FIG. 2 is a view showing a cross section of the honeycomb structural body 5 produced by the method according to the first exemplary embodiment in a direction perpendicular to an axial direction of the honeycomb structural body 5.

As shown in FIG. 1 and FIG. 2, the method according to the first exemplary embodiment produces the honeycomb structural body 5. The honeycomb structural body 5 is comprised of an outer skin layer 51 having a cylindrical shape, cell walls 52 arranged in the outer skin layer 51 and a plurality of cells 53 surrounded by the cell walls 52. The cell walls 52 are arranged in a square lattice like shape in the outer skin layer 51.

The honeycomb structural body 5 has a cross section (see FIG. 2) which is perpendicular to an axial direction of the honeycomb structural body 5. The cross section has a structure composed of a central section 54 and an outer peripheral section 55. The central section 54 contains a central axis of the honeycomb structural body 5. The outer peripheral section 55 surrounds the overall central section 54 and has a cell density which is lower than a cell density of the central section 54. In particular, a boundary partition wall 56 is formed between the central section 54 and the outer peripheral section 55. The boundary partition wall 56 separates the central section 54 from the outer peripheral section 55.

The method of producing the honeycomb structural body 5 according to the first exemplary embodiment performs at least a shaping step and a firing step.

Figure 3:
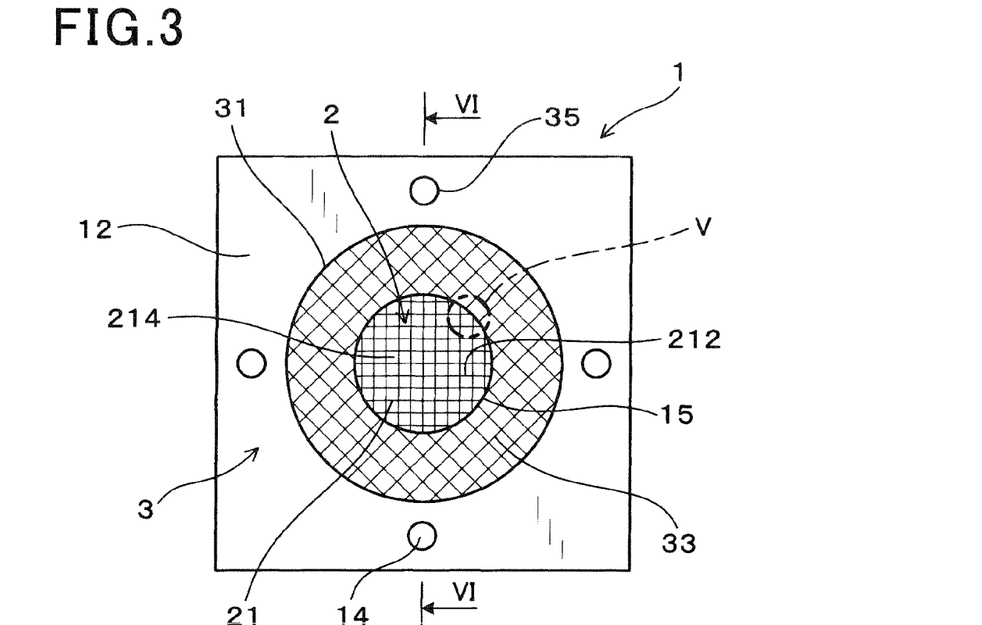
FIG. 3 is a front view of a metal die 1 to be used by the method of producing the honeycomb molded body 4 according to the first exemplary embodiment of the present invention.
Figure 4:
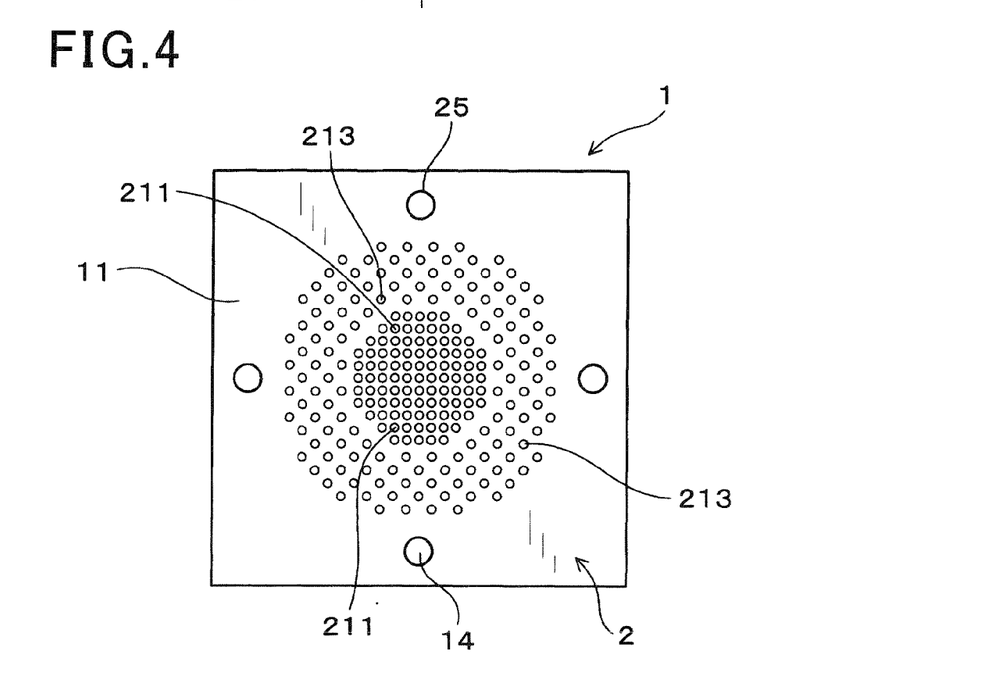
FIG. 4 is a rear view of the metal die 1 shown in FIG. 3.
Figure 5:
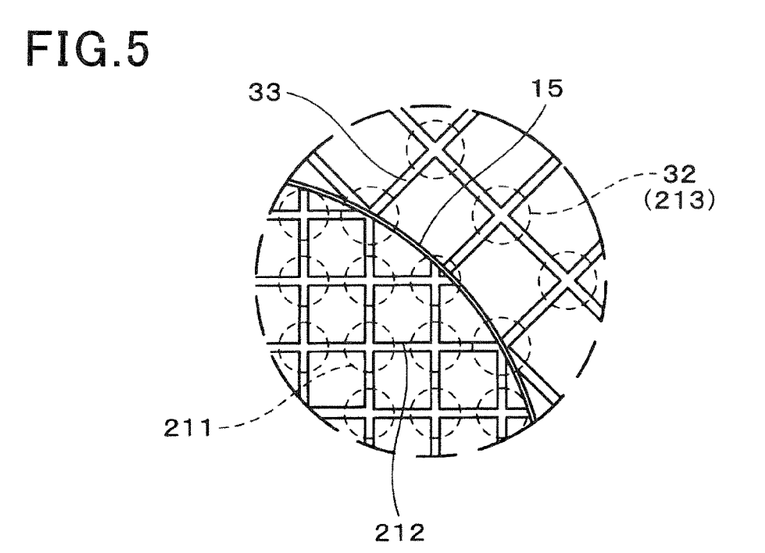
FIG. 5 is an enlarged view showing an area V in the metal die 1 shown in FIG. 3.
Figure 6:
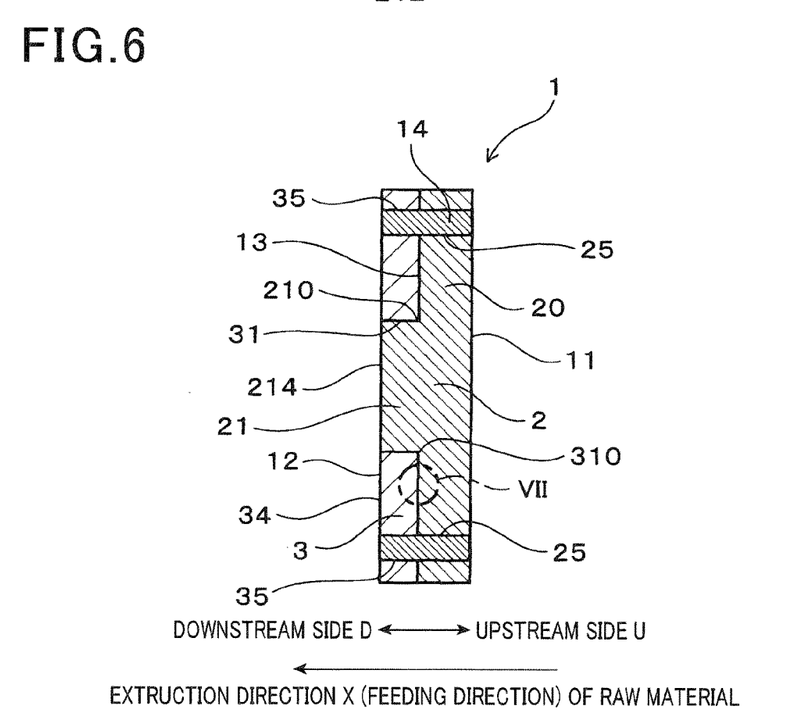
FIG. 6 is a view showing a cross section of the metal die 1 taken along the line VI-VI shown in FIG. 3.
Figure 7:
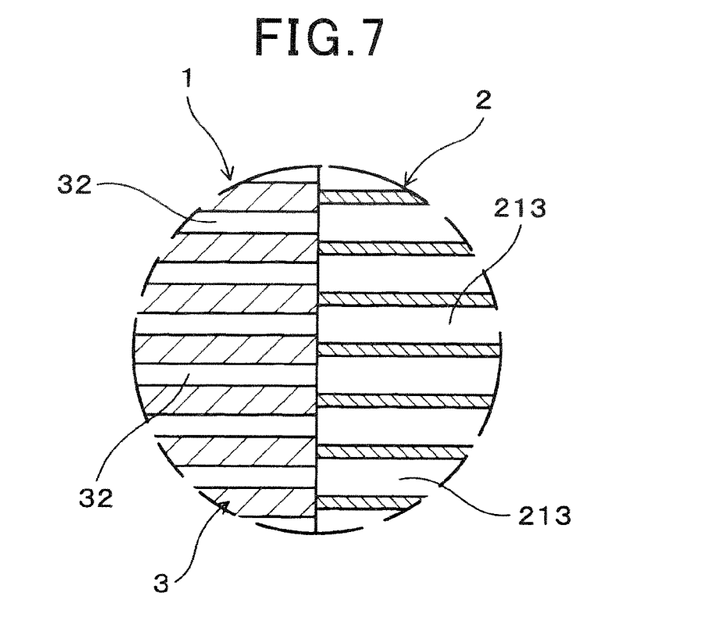
FIG. 7 is an enlarged view showing an area VII shown in FIG. 6.

FIG. 3 to FIG. 7 show a structure of a metal die 1 to be used by the method according to the first exemplary embodiment. The metal die 1 is comprised of a first metal die 1 and a second metal die 2. FIG. 3 is a front view of the metal die 1 to be used by the method of producing the honeycomb molded body 5 according to the first exemplary embodiment. FIG. 4 is a rear view of the metal die 1 shown in FIG. 3. FIG. 5 is an enlarged view showing an area V in the metal die 1 shown in FIG. 3. FIG. 6 is a view showing a cross section of the metal die 1 taken along the line VI-VI shown in FIG. 3. FIG. 7 is an enlarged view showing an area VII shown in FIG. 6.

As shown in FIG. 6, in the shaping step, raw material (not shown) is fed from a feeding side 11 of the metal die 1 and the raw material is extruded through an extrusion surface 12 in order to have a honeycomb molded body 4. As shown in FIG. 1 and FIG. 2, the honeycomb molded body 4 has the same shape of the honeycomb structural body 5 as a product. The firing step fires the honeycomb molded body 4 to produce the honeycomb structural body 5. As shown in FIG. 3 to FIG. 19, the shaping step uses the metal die 1 having a specific structure to produce the honeycomb molded body 4.

Figure 8:
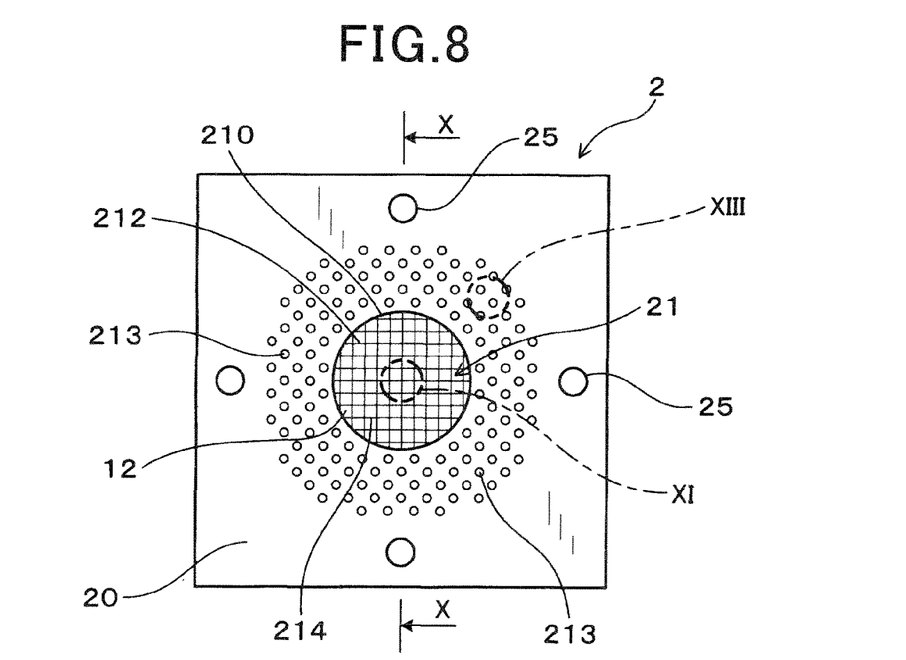
FIG. 8 is a front view of a first metal die 2 in the metal die 1 according to the first exemplary embodiment of the present invention.
Figure 9:
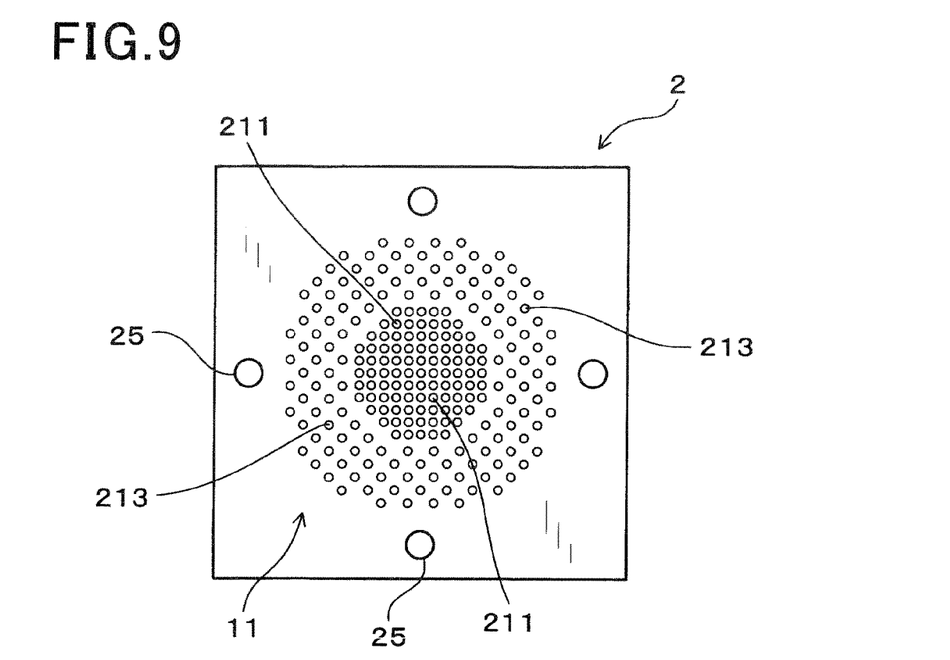
FIG. 9 is a rear view of the first metal die 2 shown in FIG. 8.
Figure 10:
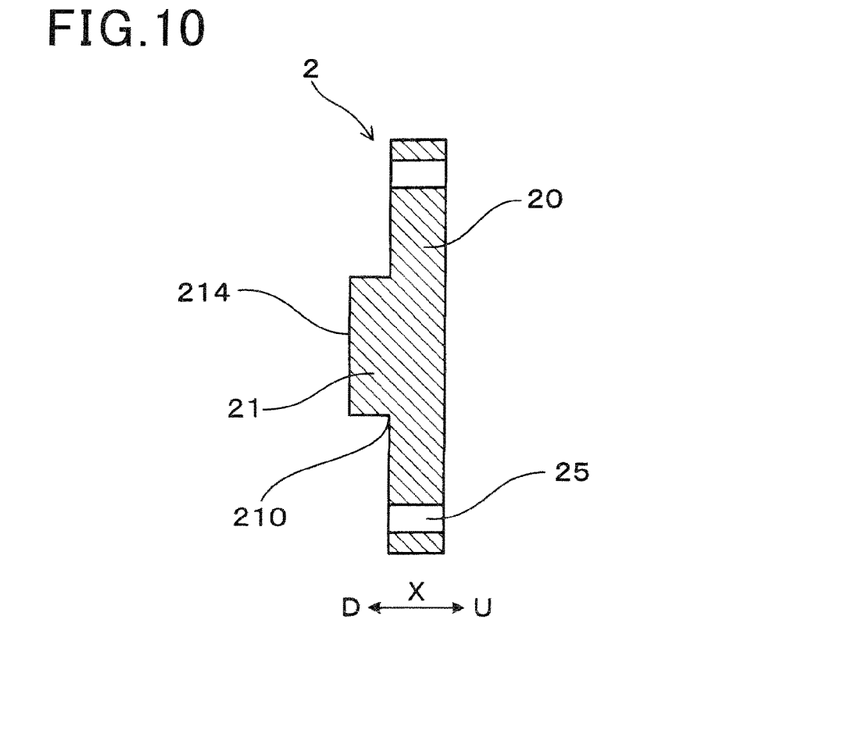
FIG. 10 is a view showing a cross section of the first metal die 2 of the metal die 1 taken along the line X-X shown in FIG. 8.
Figure 11:
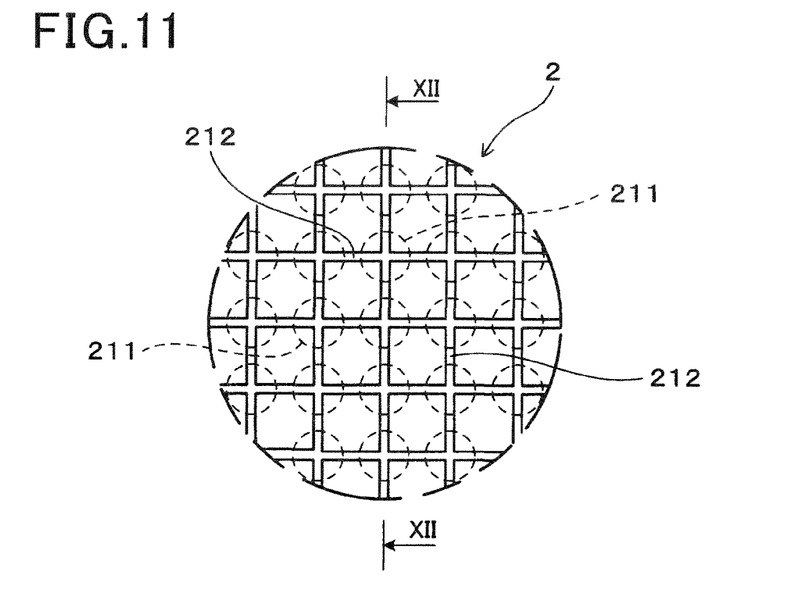
FIG. 11 is an enlarged view showing an area XI shown in FIG. 8.
Figure 12:
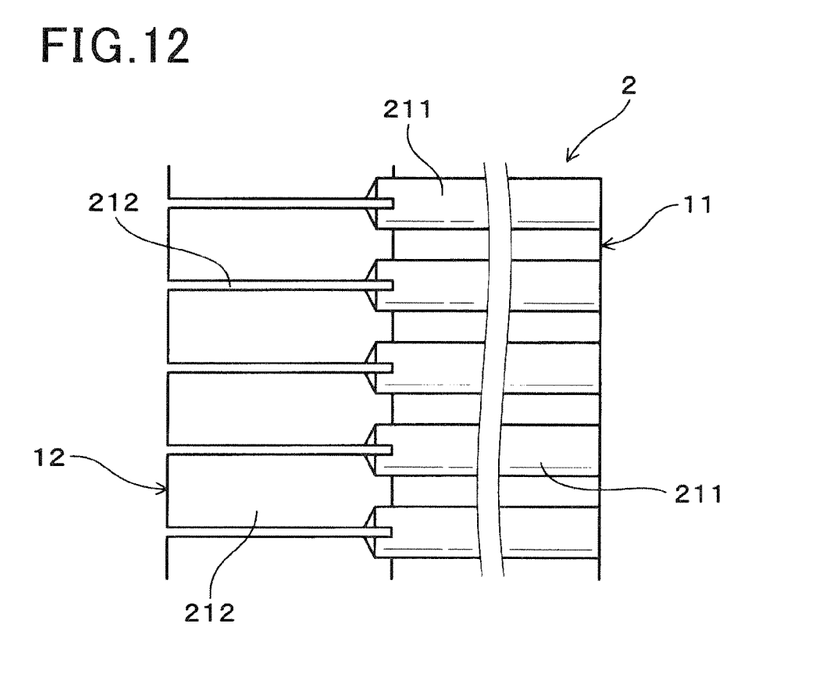
FIG. 12 is a view showing a cross section of the first metal die 2 taken along the line XII-XII shown in FIG. 11.
Figure 13:
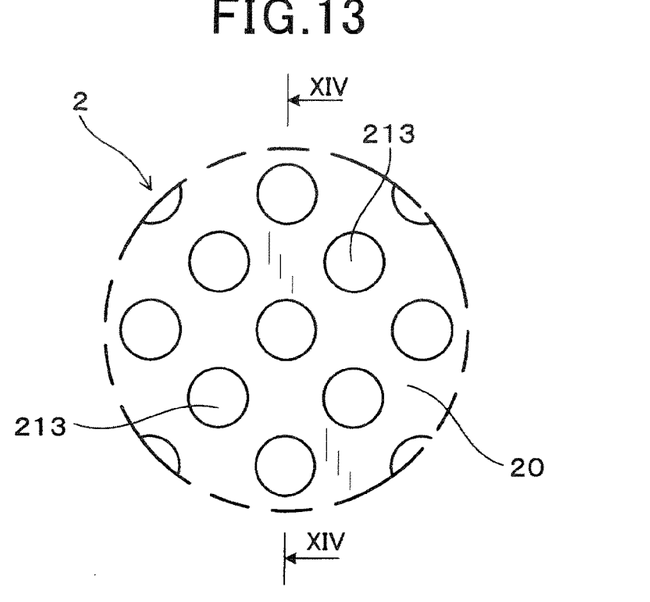
FIG. 13 is an enlarged view showing an area XIII in the first metal die 2 shown in FIG. 8.
Figure 14:
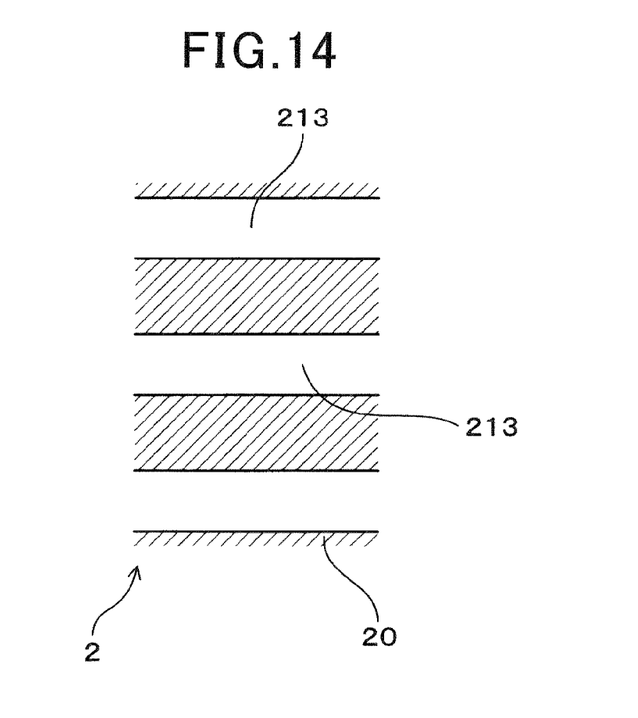
FIG. 14 is a view showing a cross section of the first metal die 2 taken along the line XIV-XIV shown in FIG. 13.

FIG. 8 to FIG. 14 show a structure of the first metal die 2 in the metal die 1. FIG. 8 is a front view of the first metal die 2. FIG. 9 is a rear view of the first metal die 2. FIG. 10 is a view showing a cross section of the first metal die 2 of the metal die 1 taken along the line X-X shown in FIG. 8. FIG. 11 is an enlarged view showing an area XI shown in FIG. 8. FIG. 12 is a view showing a cross section of the first metal die 2 taken along the line XII-XII shown in FIG. 11. FIG. 13 is an enlarged view showing an area XIII in the first metal die 2 shown in FIG. 8. FIG. 14 is a view showing a cross section of the first metal die 2 taken along the line XIV-XIV shown in FIG. 13.

Figure 15:
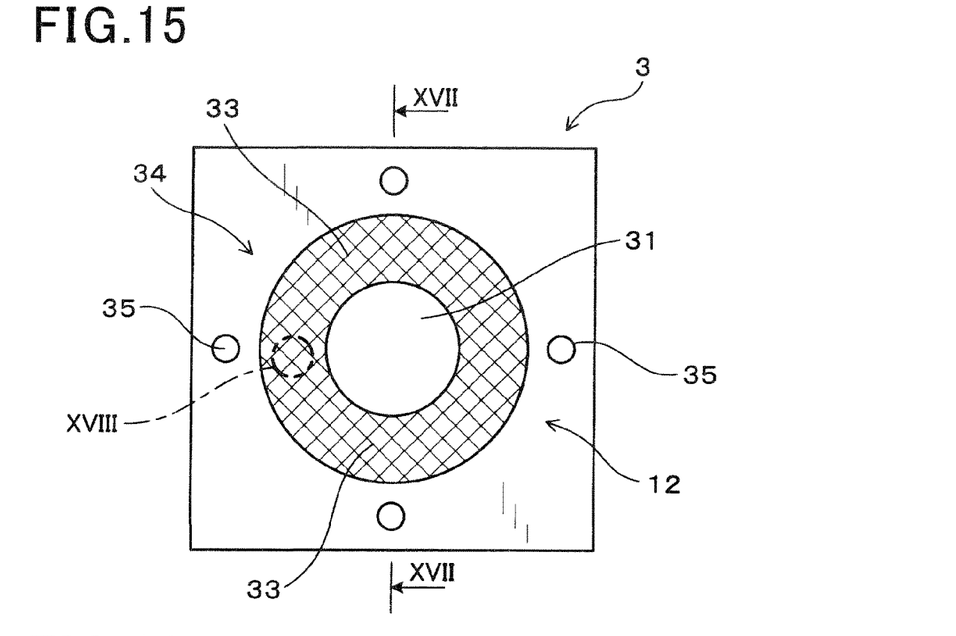
FIG. 15 is a front view of a second metal die 3 in the metal die 1 according to the first exemplary embodiment of the present invention.
Figure 16:
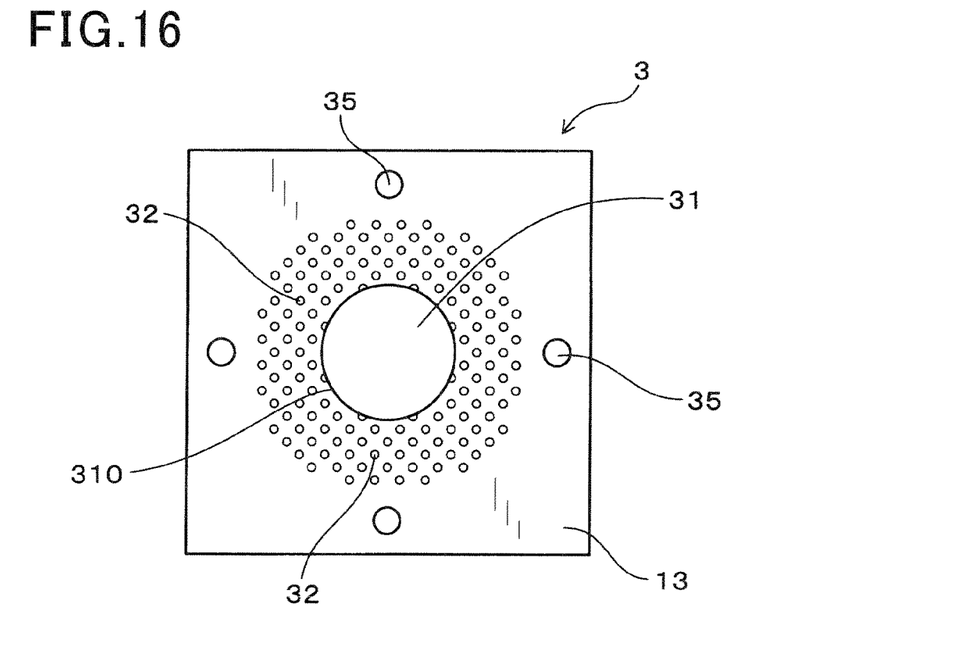
FIG. 16 is a rear view of the second metal die 3 shown in FIG. 15.
Figure 17:
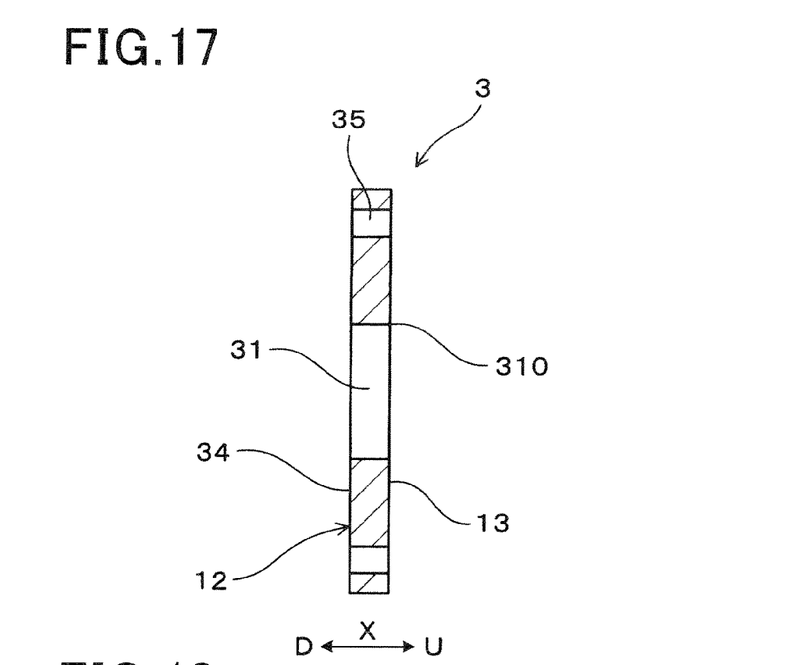
FIG. 17 is a view showing a cross section of the second metal die 3 of the metal die 1 taken along the line XVII-XVII shown in FIG. 15.
Figure 18:
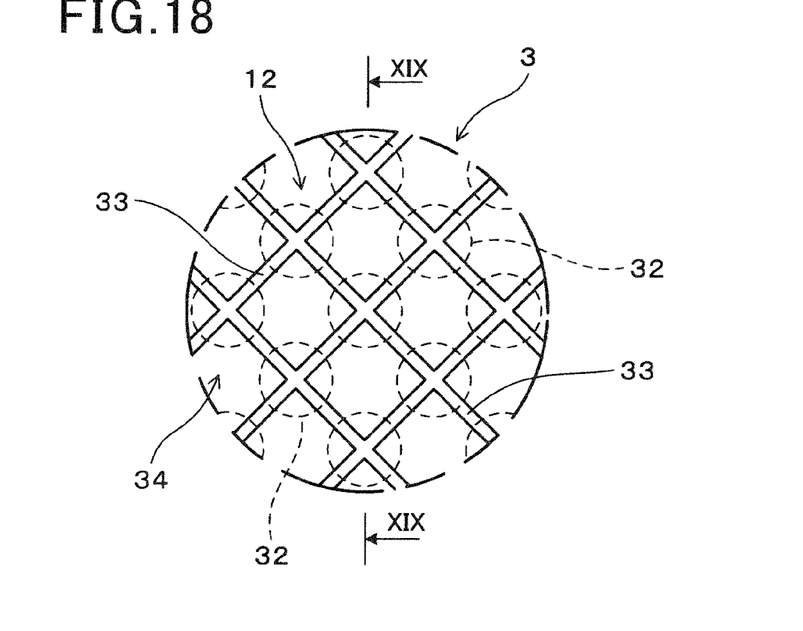
FIG. 18 is an enlarged view showing an area XVIII shown in FIG. 15.
Figure 19:
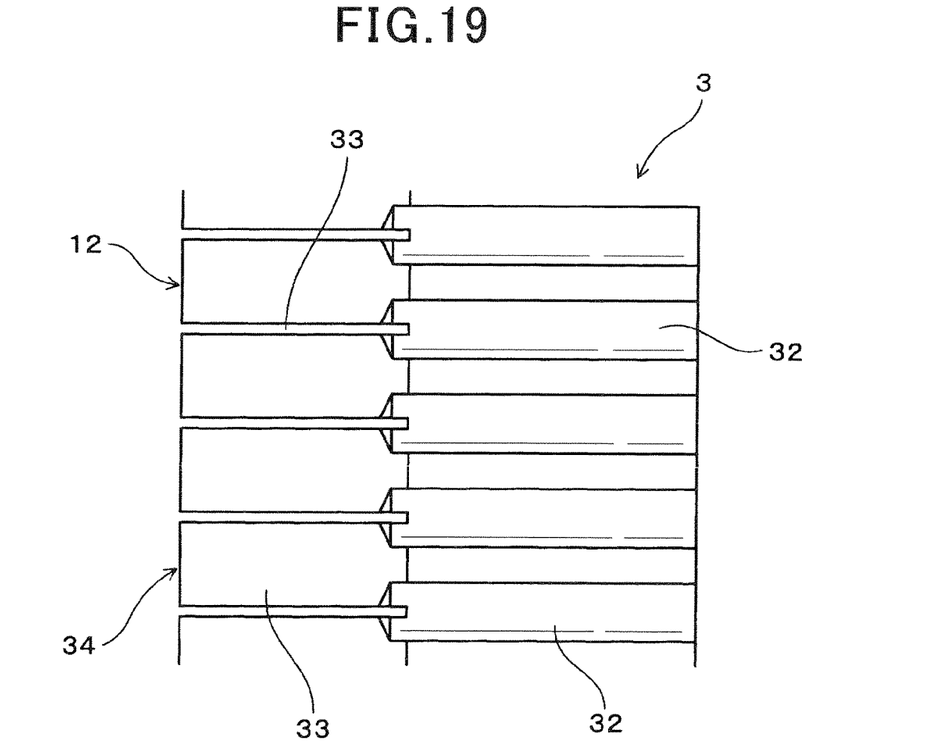
FIG. 19 is a view showing a cross section of the second metal die 3 taken along the line XIX-XIX shown in FIG. 18.

FIG. 15 to FIG. 19 show a structure of the second metal die 3 in the metal die 1. That is, FIG. 15 is a front view of the second metal die 3 according to the first exemplary embodiment. FIG. 16 is a rear view of the second metal die 3 shown in FIG. 15. FIG. 17 is a view showing a cross section of the second metal die 3 taken along the line XVII-XVII shown in FIG. 15. FIG. 18 is an enlarged view showing an area XVIII shown in FIG. 15. FIG. 19 is a view showing a cross section of the second metal die 3 taken along the line XIX-XIX shown in FIG. 18.

A description will now be given of the structure of the metal die 1 to be used in the shaping step in the method according to the first exemplary embodiment.

As shown in FIG. 6, the first metal die 2 of the metal die 1 is arranged at the upstream side U in the extrusion direction through which raw material is fed and extruded. The second metal die 3 of the metal die 1 is arranged at the downstream side D in the extrusion direction. The first metal die 2 has a plate section 20 and a projection section 21. The plate section 20 has a plate shape. As shown in FIG. 6 and FIG. 10, the projection section 21 projects toward the downstream side D from the plate section 20.

As shown in FIG. 6 and FIG. 17, the second metal die 3 has a penetration hole 31 which is fitted to the projection section 21 of the first metal die 2 when the first metal die 2 and the second metal die 3 are assembly connected together. The penetration hole 31 is formed in a thickness direction (i.e. an extrusion direction X) of the second metal die 3 having a plate shape.

As shown in FIG. 3 to FIG. 6, the projection section 21 of the first metal die 2 is inserted into the penetration hole 31 and fitted to the second metal die 3 to make an assembled member, i.e. the metal die 1.

The surface of the plate section 20 of the first metal die 2, which faces the downstream side D, is fitted to the surface of the second metal die 3, which faces the upstream side U, to make an abutting surface 13.

A front section 214 of the projection section 21, which has been inserted in the penetration hole 31, does not project from the surface 34 of the second metal die 3 at the downstream side D. That is, the front section 214 of the projection section 21 in the first metal die 2 and the surface 34 of the second metal die 3 have the same surface to make the extrusion surface 12.

FIG. 6 shows a cross section of the metal die 1. FIG. 10 shows a cross section of the first metal die 2 of the metal die 1. FIG. 17 shows a cross section of the second metal die 3 of the metal die 1. The feeding holes and the slits are omitted from FIG. 6 and FIG. 10 and FIG. 17 for brevity. The feeding holes and the slits will be explained later in detail.

As shown in FIG. 8 to FIG. 12, the first metal die 2 has a plurality of raw material first feeding holes 211 and a plurality of first slits 212. The raw material first feeding holes 211 extend toward the extrusion direction X from the feeding surface 11 in the projection section 21 of the first metal die 2. The first slits 212 are formed in the extrusion surface 12 side in a honeycomb structural shape so that the first slits 212 communicate with the raw material first feeding holes 211.

On the other hand, as shown in FIG. 8, FIG. 9, FIG. 13 and FIG. 14, a plurality of raw material second feeding holes 213 is formed around the projection section 21 in the first metal die 2. The raw material second feeding holes 213 penetrate from the feeding surface 11 in the projection section 21 of the first metal die 2 to the abutting surface 13 which faces the second metal die 3.

A cross section of each of the raw material first feeding holes 211 and the raw material second feeding holes 213 has a circular shape. In particular, the raw material second feeding holes 213 are arranged in a low density when compared with the arrangement density of the raw material first feeding holes 211. That is, a distance between adjacent raw material second feeding holes 213 is larger than a distance between adjacent raw material first feeding holes 211. It is acceptable for the raw material first feeding holes 211 and the raw material second feeding holes 213 to have the same diameter or a different diameter. The plate section 20 in the first metal die 2 has a thickness of 9.5 mm, and the projection section 21 has a height of 10.5 mm.

As shown in FIG. 15 to FIG. 19, the second metal die 3 of a plate shape has a plurality of communication holes 32 and second slits 33. The communication holes 32 are formed around the penetration hole 31 in the second metal die 3 and extend from the abutting surface 13 to the thickness direction (i.e. the extrusion direction X).

Another tool (not shown) is fitted to the outer periphery of the second slit 33 in the second metal die 3 in order to form an outer peripheral section 45. During the extrusion of the raw material from the second slit 33 when the honeycomb molded body 4 is formed, the outer peripheral section 45 is formed simultaneously. The second metal die 3 has a thickness of 10.5 mm.

As shown in FIG. 3 and FIG. 5, a small gap 15 is formed between the projection section 21 in the first metal die 2 and the periphery of the penetration hole 31 in order to form a boundary partition wall 46 having a cylindrical shape. Further, as shown in FIG. 7, each of the communication holes 32 in the second metal die 3 communicates with the corresponding communication hole in the raw material second feeding holes 213 in the first metal die 2.

As shown in FIG. 8 to FIG. 10, and FIG. 5 to FIG. 7, a positioning hole 25 is formed in the first metal die 2, and a positioning hole 35 is formed in the second metal die 3. The positioning hole 25 and the positioning hole 35 are formed at the same position when the first metal die 2 and the second metal die 3 are assembled and fitted to each other.

As shown in FIG. 3, FIG. 4 and FIG. 6, when the first metal die 2 and the second metal die 3 are assembled together to make the metal die 1, a knock pin is inserted in each of the positioning hole 25 and the positioning hole 35. Each of the knock pins is used as a positioning member 14. In addition, one or more bolt holes (not shown) are formed in each of the first metal die 2 and the second metal die 3 in addition to the positioning hole 25 and the positioning hole 35. The first metal die 2 and the second metal die 3 are assembled and fixed together by bolts in the bolt holes.

A description will now be given of the method of producing the honeycomb structural body 5 by using the metal die 1 in detail.

First, raw material in a clay state is prepared. For example, it is possible to use raw material capable of generating cordierite, SiC, etc. after firing. As shown in FIG. 3 to FIG. 6, raw material in clay state (not shown) is fed to the inside of the metal die 1. The raw material is supplied from the raw material first feeding holes 211 and the raw material second feeding holes 213 at the upstream side U of the metal die 1. (see FIG. 4)

As shown in FIG. 3 to FIG. 6, the raw material supplied into the raw material first feeding holes 211 is extruded from the first slits 212, which communicate with the raw material first feeding holes 211 in the extrusion surface 12, in order to have a honeycomb molded body 4 having a honeycomb structure.

As shown in FIG. 7, the raw material fed to the raw material second feeding holes 213 passes from the raw material second feeding holes 213 to the communication holes 32 in the second metal die 3. The communication holes 32 in the second metal die 3 communicate with the raw material second feeding holes 213. As shown in FIG. 3 and FIG. 5, the raw material is then extruded from the second slit 33 at the extrusion surface 12 side to produce the honeycomb molded body 4 having a honeycomb structure. In addition, the boundary partition wall 46 having a cylindrical shape is also extruded simultaneously through the gap 15 when the raw material is extruded from the extrusion surface 12 side. The honeycomb molded body 4 can be produced by the method previously described.

That is, as shown in FIG. 1 and FIG. 2, the shaping step using the metal die 1 previously described can produce the honeycomb molded body 4. The honeycomb molded body 4 has an outer skin layer 41 of a cylindrical shape, the cell walls 42 and a plurality of the cells 43. The cell walls 42 are arranged in a square lattice like shape in the outer skin layer 41. Each of the cells 43 is surrounded by the cell walls 42.

The honeycomb molded body 4 is comprised of a central section 44 and an outer peripheral section 45. The central section 44 contains the central axis of the honeycomb molded body 4 (i.e. the honeycomb structural body 5). The outer peripheral section 45 covers the outside of the central section 44 and has a cell density which is lower than the cell density of the central section 44. The boundary partition wall 46 having a cylindrical shape is formed between the central section 44 and the outer peripheral section 45.

Next, the honeycomb molded body 4 is dried and fired at an optimum high temperature of the raw material. As shown in FIG. 1 and FIG. 2, the honeycomb structural body 5 can be produced by the method according to the first exemplary embodiment previously described. FIG. 1 and FIG. 2 show both the honeycomb molded body 4 and the honeycomb structural body 5 for brevity.

Still further, because the axial direction of the honeycomb structural body 5 (i.e. the honeycomb molded body 4) is equal to the extrusion direction of the raw material have the same, those directions are designated by the same reference character "X" in the drawings.

A description will now be given of the features (i.e. actions and effects) of the method of producing the honeycomb structural body 5 according to the first exemplary embodiment.

The method according to the exemplary embodiment performs at least the shaping step and the firing step to produce the honeycomb structural body 5. As shown in FIG. 3 to FIG. 7, the shaping step uses the metal die 1 composed of the first metal die 2 and the second metal die 3 having the specific structure previously described.

When raw material is supplied to the feeding surface 11, the raw material passes through the raw material first feeding holes 211 in the first metal die 2, and is extruded from the first slit 212 to form a honeycomb structure. Further, the raw material passes through the communication holes 32 in the second metal die 3, and is extruded from the second slits 33 to produce the honeycomb molded body 4 having a honeycomb structure. In particular, it is possible to use a metal die having a structure in which the first slits 212 and the second slits 33 have a different cell density and a different shape. This makes it possible to produce the honeycomb structural body 5 having a desired cell structure such as a complicated cell structure according to demands. As shown in FIG. 1 and FIG. 2, the honeycomb structural body 5 having a structure in which the central section 54 and the outer peripheral section 55 have a different cell density, and the outer peripheral section 55 surrounds the overall area of the central section 54 and has a cell density which is lower than a cell density of the central section 54.

In the projection section 21 of the first metal die 2, the raw material is smoothly extruded from the feeding surface 11 through the raw material first feeding holes 211, and then from the first slits 212 at the extrusion surface 12 side. On the other hand, the raw material which has passed through the raw material second feeding holes 213 in the first metal die 2 is smoothly extruded from the second slits 33 in the extrusion surface 12 side through the communication holes 32 in the second metal die 3, which communicate with the raw material second feeding holes 213.

Although the first metal die 2 is deformed during the shaping step, because the surface of the second metal die 3 receives the deformation stress of the first metal die 2, it is possible to suppress the deformation stress of the first metal die 2 from increasing, and decrease the generation of the stress generated in the first metal die 2. Accordingly, even if a shaping pressure increases during the shaping step, the structure of the metal die 1 makes it possible to suppress generation of high stress in the first metal die 2 and the second metal die 3 in the metal die 1. In other words, it is possible to perform the shaping step (of feeding and extruding the raw material) at a high shaping pressure by using the metal die 1 according to the first exemplary embodiment. This makes it possible to produce the honeycomb structural body 5 with a high productivity.

The shaping step in the method according to the first exemplary embodiment produces the honeycomb molded body 4. The honeycomb molded body 4 has the outer skin layer 41 having a cylindrical shape, the cell walls 42 arranged in a lattice-like shape in the outer skin layer 41 and the cells 43 surrounded by the cell walls 42 (see FIG. 1 and FIG. 2). In particular, the honeycomb molded body 4 has a cross section, which is perpendicular to the axial direction X of the honeycomb molded body 4, in which the central section 44 and the outer peripheral section 45 have a different cell density, and the boundary partition wall 46 is formed between the central section 44 and the boundary partition wall 46. The central section 44 contains the central axis of the honeycomb molded body 4. The outer peripheral section 45 surrounds the central section 44.

Because the method according to the first exemplary embodiment uses the metal die 1 composed of the first metal die 2 and the second metal die 3, it is possible to easily produce the honeycomb molded body 4 having a complicated cell structure.

By the way, the conventional metal die, disclosed in the conventional technique, Japanese laid open publication No. H04-332604, has an imperfect shape, i.e. has not a circular shape of a raw material feeding hole with which the boundary partition wall is formed. This supplies an insufficient amount of raw material to the raw material feeding hole, as a result, the boundary partition wall of an imperfect shape is generated in the produced honeycomb molded body 4.

On the other hand, because the metal die 1 used by the method according to the first exemplary embodiment can supply raw material to the gap 15 through the raw material feeding holes having a perfect circular shape (see FIG. 5), it is possible to stably feed the raw material, and form the boundary partition wall 46 without generation of a deformation in the honeycomb molded body 4.

Furthermore, as shown in FIG. 8 to FIG. 10, and FIG. 15 to FIG. 17, the first metal die 2 and the second metal die 3 in the metal die 1 have the positioning holes 25 and 35, respectively. As shown in FIG. 3, FIG. 4 and FIG. 6, it is preferable that the positioning members 14 have been inserted into the positioning holes 25 and 35 to fix the first metal die 2 and the second metal die 3 together in the metal die 1 by the positioning members 14. This structure using the positioning members 14 makes it possible to easily separate the first metal die 2 from the second metal die 3 and reassemble the first metal die 2 and the second metal die 3 with a high accuracy. Further, this structure makes it possible to avoid an angular difference in position between the cell walls 42 extruded from the first slit 212 and the second slit 33. As a result, it is possible for the method according to the first exemplary embodiment using the metal die 1 having the structure previously described to produce the honeycomb structural body 1 having less manufacture irregularity.

Still further, it is preferable to connect the first metal die 2 and the second metal die 3 together in the metal die 1 shown in FIG. 6. In the structure of the metal die 1 according to the first exemplary embodiment, the first metal die 2 and the second metal die 3 are assembly connected by using one or more blots (not shown). This makes it possible to use the metal die 1 as a monolithic member, and increase the strength of the metal die 1. It is possible to use another fixing method such as a welding in order to assemble and fix the first metal die 2 and the second metal die 3 to each other.

Still further, it is sufficient that each of the raw material second feeding holes 213 in the first metal die 2 corresponds in a coordinate to each of the communication holes 32 in the second metal die 3. It is also acceptable for each of the raw material second feeding holes 213 and the communication holes 32 to have a same diameter or a different diameter (see FIG. 7, FIG. 8 and FIG. 16).

It is preferable for each of the raw material second feeding holes 213 in the first metal die 2 to have a diameter which is larger than a diameter of each of the communication holes 32 in the second metal die 3 (see FIG. 7). This structure makes it possible to prevent an insufficient feeding amount of raw material caused by a positional displacement between the raw material second feeding holes 213 and the communication holes 32 during the shaping step. Accordingly, this structure of the raw material second feeding holes 213 and the communication holes 32 makes it possible to prevent generation of a structural defect of the cell walls 42 which are extruded from the second slit 33. Similarly, it is preferable for the metal die 1 to have a relationship within a range of $0<\varphi1-\varphi2\leq135$, where $\varphi1$ (µm) indicates a diameter of each of the raw material second feeding holes 213, and $\varphi2$ (µm) indicates a diameter of each of the communication holes 32.

It is preferable for each of a corner section 210 of the projection section 21 in the first metal die 2 and a contact section 310 in the second metal die 3 to have a curved surface or a slope surface, where the corner section 210 in the first metal die 2 is in contact with the contact section 310 in the second metal die 3 when the first metal die 2 and the second metal die 3 are assembled together. This structure makes it possible to relax a concentration of stress applied to the corner section 210 in the first metal die 2 and the contact section 310 in the second metal die 3, and allow the method of the first exemplary embodiment to use a high shaping pressure during the shaping step (of feeding and extruding raw material). This makes it possible to produce the honeycomb structural body 5 with a high productivity.

The first exemplary embodiment has explained the method of producing the honeycomb structural body 5 having a different cell density structure in which the central section 44 and the outer peripheral section 45 have a different cell density, in a cross section perpendicular to the axial direction X of the honeycomb structural body 5, and the boundary partition wall 46 is formed between the central section 44 and the outer peripheral section 45. However the concept of the present invention is not limited by this example. It is possible to apply the concept of the first exemplary embodiment to methods of producing honeycomb structural bodies having various cell structures with a high productivity.

Second Exemplary Embodiment

A description will be given of the second exemplary embodiment with reference to FIG. 20 and FIG. 21.

The second exemplary embodiment evaluates a degree in deformation or displacement between the first metal die 2 and the second metal die 3 in the metal die 1 when raw material is extruded through the metal die 1 composed of the first metal die 2 and the second metal die 3. That is, the second exemplary embodiment performs the evaluation test using the metal die 1 having the structure previously explained in the first exemplary embodiment, and the following explanation will use the same reference numbers and characters used in the first exemplary embodiment.

The second exemplary embodiment prepared various types of metal dies as evaluation test samples. Each of the evaluation test samples basically has the same components of the metal die 1 according to the first exemplary embodiment, but has a different thickness ratio of the first metal die 2 and the second metal die 3.

It is possible to calculate the thickness ratio of each of the test samples (as the metal dies) by using an equation regarding the thickness ratio $T_1/(T_1+T_2)$, where $T_1$ indicates a minimum thickness (mm) of the first metal die 2, and $T_2$ indicates a minimum thickness (mm) of the second metal die 3.

Next, the second exemplary embodiment used the same method according to the first exemplary embodiment to produce the evaluation test samples (i.e. the honeycomb molded bodies 4) by the using the metal dies having a different value of the thickness ratio $T_1/(T_1+T_2)$. Further, the second exemplary embodiment detected a thickness of each of the first metal die 2 and the second metal die 3 after the production of the test samples, and determined a displacement difference (µm) which is equal to a difference in detected thickness between the first metal die 2 and the second metal die 3.

Figure 20:
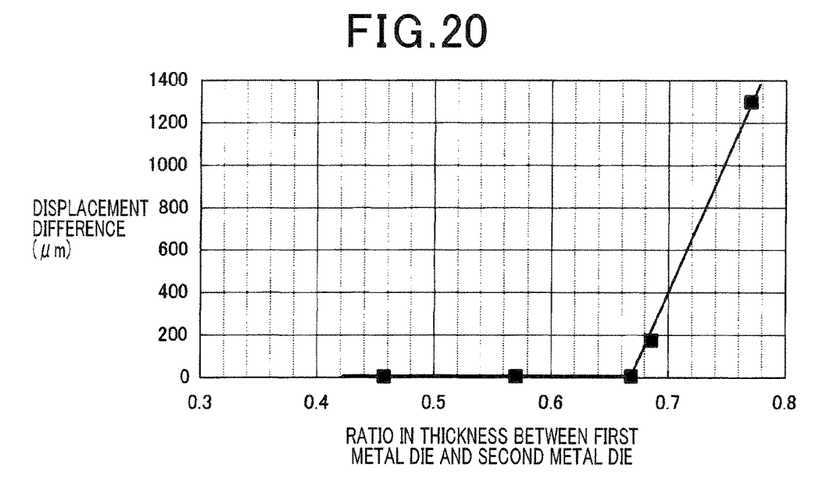
FIG. 20 is a view showing a relationship between a ratio of a thickness of the first metal die 2 and the second metal die 3 and a displacement difference (μm) between the first metal die 2 and the second metal die 3 forming each metal die according to a second exemplary embodiment of the present invention.

FIG. 20 is a view showing a relationship between the ratio of a thickness of the first metal die 1 and the second metal die 3 and the displacement difference (µm) between the first metal die 2 and the second metal die 3 forming each metal die according to the second exemplary embodiment.

The second exemplary embodiment further detected a relationship between a Young's modulus ratio $E_1/E_2$ and the displacement difference, where the Young's modulus ratio $E_1/E_2$ is a ratio between a Young's modulus E1 of the first metal die 2 and a Young's modulus $E_2$ of the second metal die 3 in each metal die 1 as each test sample. That is, this Young's modulus ratio E1/E2 can be calculated on the basis of the Young's modulus $E_1$ of the first metal die 2 and the Young's modulus $E_2$ of the second metal die 3.

Figure 21:
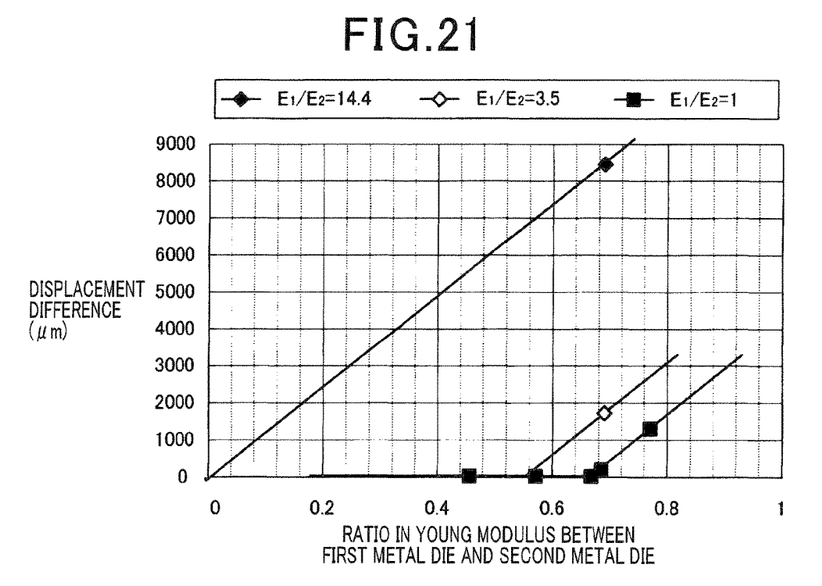
FIG. 21 is a view showing a relationship between a Young's modulus ratio $E_1/E_2$ and the displacement difference (μm) between the first metal die 2 and the second metal die 3 in each metal die according to the second exemplary embodiment of the present invention.

FIG. 21 is a view showing a relationship between the Young's modulus ratio $E_1/E_2$ and the displacement difference (µm) between the first metal die 2 and the second metal die 3 in each metal die according to the second exemplary embodiment.

As can be understood from the results shown in FIG. 20, it is possible to obtain the displacement difference (µm) of approximately zero when the thickness ratio $T_1/(T_1+T_2)$ satisfies a relationship of $T_1/+T_2)\leq0.67$.

By the way, it is difficult to decrease the displacement difference (µm) as low as possible when the Young's modulus ratio $E_1/E_2$ is satisfies a relationship of $E_1/E_2\geq14.4$ even if the thickness ratio $T_1/(T_1+T_2)$ is changed, where $E_1$ indicates the Young's modulus of the first metal die 2 and $E_2$ indicates the Young's modulus of the second metal die 3. It is therefore preferable for the metal die 1 comprised of the first metal die 2 and the second metal die 3 to satisfy the relationship of $E_1/E_2<14.4$ and the relationship of $T_1/(T_1+T_2)\leq0.67$, where $E_1$ indicates the Young's modulus of the first metal die 2, $E_2$ indicates the Young's modulus of the second metal die 3, $T_1$ is the minimum thickness of the first metal die 2, and $T_2$ indicates the minimum thickness of the second metal die 3.

As previously explained in detail, it is possible for the deformation of the first metal die 2 and the second metal die 3 to smoothly follow and coincide with the deformation of the metal die 1 when raw material is extruded through the metal die 1 comprised of the first metal die 2 and the second metal die 3. As a result, it is possible for the method according to the exemplary embodiment using the metal die 1, which satisfies the relationships previously described, to correctly produce the honeycomb molded body 4 and the honeycomb structural body 5 having a correct structure without deformation and generating defects of the cell walls 42, the boundary partition wall 46, the outer skin layer 41, etc. By the way, it is possible to adjust the Young's modulus of the first metal die 2 and the second metal die 3 by selecting an optimum material of a metal die. For example, it is possible to use various metal dies made of iron alloy.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A method of producing a honeycomb structural body using a metal die, comprising steps of:
    shaping a honeycomb molded body by feeding raw material from a feeding surface side to an inside of the metal die, and extruding the fed raw material from an extrusion surface of the metal die outside of the metal die; and
    firing the honeycomb molded body to produce a honeycomb structural body, wherein
    the method uses the metal die comprising a first metal die arranged at an upstream side of an extrusion direction of the raw material and a second metal die arranged at a downstream side of the extrusion direction, wherein
    the first metal die comprises:
        a projection section projected toward the downstream side of the first metal die in the extrusion direction;
        a plurality of raw material first feeding holes;
        first slits; and
        a plurality of raw material second feeding holes, wherein the plurality of raw material first feeding holes are formed in the projection section extending from the feeding surface toward the extrusion direction,
        the first slits are formed in a honeycomb structural shape on the extrusion surface to communicate with the plurality of raw material first feeding holes, and
        the plurality of raw material second feeding holes are formed around the projection section of the first metal die, and the feeding surface communicates with an abutting surface of the second metal die through the plurality of raw material second feeding holes,
    the second metal die comprises:
        a penetration hole fitted with the projection section of the first metal die in the metal die;
        a plurality of communication holes which are formed around the penetration hole and extended toward the extrusion direction from the abutting surface side; and
        second slits arranged in a honeycomb structural shape on the extrusion surface to communicate with the plurality of communication holes, and
        the plurality of communication holes in the second metal die communicating with the raw material second feeding holes in the first metal die.

2. The method of producing a honeycomb structural body according to claim 1, wherein the shaping step shapes the honeycomb molded body which comprises:
    an outer skin layer having a cylindrical shape;
    cell walls arranged in a lattice like shape in the outer skin layer; and
    a plurality of cells surrounded by the cell walls,
    wherein a central section and an outer peripheral section are formed in a cross section which is perpendicular to an axial direction of the honeycomb molded body, the axial direction is equal to the extrusion direction, and
    the central section contains a central axis of the honeycomb molded body and the outer peripheral section surrounds the central section.

3. The method of producing a honeycomb structural body according to claim 2, wherein the shaping step forms the honeycomb molded body which further comprises a boundary partition wall between the central section and the outer peripheral section so that the boundary partition wall separates the central section from the outer peripheral section.

4. The method of producing a honeycomb structural body according to claim 1, wherein the method uses the metal die in which the first metal die further comprises a positioning hole and the second metal die further comprises a positioning hole, and the first metal die and the second metal die are fixed together by using a positioning member which is inserted in the positioning holes.

5. The method of producing a honeycomb structural body according to claim 1, wherein the method uses the metal die in which the first metal die is connected to the second metal die.

6. The method of producing a honeycomb structural body according to claim 1, wherein the method produces the honeycomb molded body having a structure in which the raw material second feeding holes in the first metal die has a diameter which is larger than a diameter of the plurality of communication holes in the second metal die.

7. The method of producing a honeycomb structural body according to claim 1, wherein the method uses the metal die in which a corner section of the projection section in the first metal die has a curved surface or a slope, and a contact section in the second metal die has a curved surface or a slope so that the first metal die is fitted to the second metal die through the corner section and the contact section.

8. The method of producing a honeycomb structural body according to claim 1, wherein the method uses the metal die in which a deformation of the first metal die and the second metal die follows a deformation in the metal die generated when the raw material passes through the metal die.

9. The method of producing a honeycomb structural body according to claim 8, wherein the method uses the metal die which satisfies a relationship of $E_1/E_2<14.4$ and a relationship of $T_1/(T_1+T_2) \leq 0.67$, where $E_1$ indicates a Young's modulus of the first metal die, $E_2$ indicates a Young's modulus of the second metal die, $T_1$ is a minimum thickness of the first metal die, and $T_2$ indicates a minimum thickness of the second metal die.

* * * * *